(12) United States Patent
Cooppan et al.

(10) Patent No.: US 10,608,874 B2
(45) Date of Patent: Mar. 31, 2020

(54) DATA AGGREGATION AND WIRELESS ACCESS POINT CONFIGURATION BASED ON UNIVERSAL PLUG AND PLAY

(71) Applicant: Verizon Patent and Licensing Inc., Arlington, VA (US)

(72) Inventors: Dayalan Cooppan, Natick, MA (US); Kabir Seth, Ashland, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 96 days.

(21) Appl. No.: 15/395,351

(22) Filed: Dec. 30, 2016

(65) Prior Publication Data

US 2018/0191565 A1 Jul. 5, 2018

(51) Int. Cl.
*H04L 12/24* (2006.01)
*H04L 12/26* (2006.01)

(52) U.S. Cl.
CPC ...... *H04L 41/0809* (2013.01); *H04L 41/0816* (2013.01); *H04L 43/0894* (2013.01); *H04L 41/0853* (2013.01)

(58) Field of Classification Search
CPC ............. H04L 41/0809; H04L 41/0816; H04L 41/0853; H04W 88/06
See application file for complete search history.

(56) References Cited

U.S. PATENT DOCUMENTS

| 2006/0025141 | A1* | 2/2006 | Marsh | H04W 36/0066 455/445 |
| 2007/0211631 | A1* | 9/2007 | Rahman | H04L 12/2805 370/230 |
| 2007/0254634 | A1* | 11/2007 | Costa-Requena | H04W 8/245 455/412.1 |
| 2008/0301293 | A1* | 12/2008 | Jung | H04L 41/0809 709/224 |
| 2013/0318151 | A1* | 11/2013 | Wu | H04L 12/2809 709/203 |
| 2015/0341216 | A1* | 11/2015 | Cooppan | H04L 41/0816 709/221 |

(Continued)

OTHER PUBLICATIONS

The Broadband Forum, "CPE WAN Management Protocol," https://www.broadband-forum.org/technical/download/TR-069_Amendment-5.pdf, Nov. 2013, 228 pages.

(Continued)

*Primary Examiner* — Jeffrey M Rutkowski
*Assistant Examiner* — Chae S Lee

(57) ABSTRACT

A first Universal Plug and Play (UPNP) system, associated with a first wireless access point, can identify a second UPNP system. The second UPNP system can be associated with a second wireless access point. The first UPNP system can identify one or more parameters to be monitored with regard to the second UPNP system. The first UPNP system can provide, to the second UPNP system and using a UPNP protocol, information identifying the one or more parameters to be monitored. The first UPNP system can receive, from the second UPNP system and based on the UPNP protocol, data regarding the one or more parameters. The first UPNP system can identify an action to be performed based on the data regarding the one or more parameters. The first UPNP system can perform the action, or cause the second UPNP system to perform the action, using the UPNP protocol.

20 Claims, 7 Drawing Sheets

(56) References Cited

U.S. PATENT DOCUMENTS

2016/0134469 A1* 5/2016 Carter ................ H04L 63/0823
370/254
2016/0226732 A1* 8/2016 Kim .................... H04L 12/2807

OTHER PUBLICATIONS

Bradner, "Key words for use in RFCs to Indicate Requirement Levels," https://tools.ietf.org/html/rfc2119, Mar. 1997, 4 pages.
Open Connectivity Foundation, Inc., "UPnP Device Architecture 2.0," http://upnp.org/specs/arch/UPnP-arch-DeviceArchitecture-v2.0.pdf, Feb. 20, 2015, 196 pages.
The Broadband Forum, "TR-330: TR-069 UPnP DM Proxy Management Guidelines," https://www.broadband-forum.org/technical/download/TR-330.pdf, Aug. 2015, 47 pages.
Vedula et al., "Introduction to UPnP Device Management," http://upnp.org/resources/documents/UPnPDMIntro_March2012.pdf, Mar. 2012, 13 pages.
Lortz et al., "DeviceProtection:1 Service," http://www.upnp.org/specs/gw/UPnP-gw-DeviceProtection-v1-Service-20110224.pdf, Feb. 2011, 67 pages.

\* cited by examiner

DATA AGGREGATION AND WIRELESS ACCESS POINT CONFIGURATION BASED ON UNIVERSAL PLUG AND PLAY

BACKGROUND

Universal Plug and Play (UPNP) Device Management (DM) is an extensible device control protocol that defines services to address management operations to a UPNP device execution environment. A UPNP DM device can provide control points (CPs) with a number of capabilities, such as basic management capabilities, configuration management capabilities, software management capabilities, and/or device protection capabilities. A CP can control and communicate with one or more controlled devices using the UPNP protocol.

DETAILED DESCRIPTION OF PREFERRED EMBODIMENTS

Figure 1A:
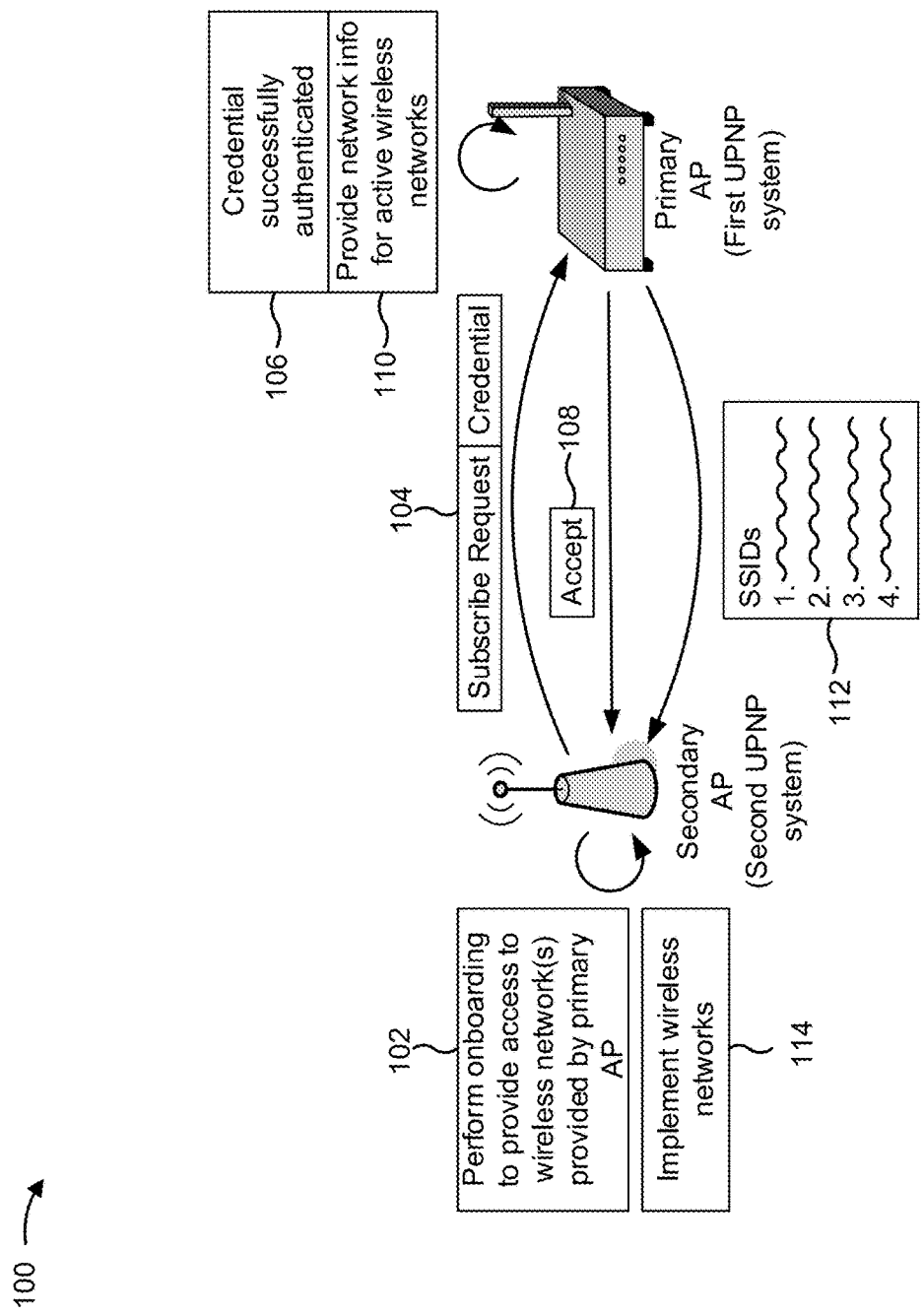
FIG. 1A-1C are diagrams of an overview of an example implementation described herein.

The following detailed description of example implementations refers to the accompanying drawings. The same reference numbers in different drawings can identify the same or similar elements.

A customer network, such as a WiFi network or a similar wireless network, can include a primary access point (AP) that provides access to one or more wireless networks. In some cases, the primary AP can act as a gateway to an external network, such as a wide area network (WAN) or the Internet. The customer network can also include one or more secondary APs that also provide access to the one or more wireless networks. For example, the one or more secondary APs can act as network extenders or WiFi extenders for the primary AP. A secondary AP can transmit information to and/or receive information from devices outside the customer network via the primary AP, which can act as a gateway to the external network. For example, in a mesh customer network, the secondary AP can transmit or receive information via a backhaul wireless network connection to the primary AP.

To extend network coverage of the primary AP, the secondary APs can need to exchange data regarding the one or more wireless networks with the primary AP. One protocol for configuring the secondary APs and exchanging such data is UPNP. In UPNP, a Control Point (CP) can subscribe to parameters of a UPNP device, and the UPNP device can provide the data when values of the parameters change. A UPNP CP is a device, component, or application that uses UPNP protocols to control UPNP controlled devices, such as the primary AP and the secondary APs.

The UPNP device (or controlled device) can include a server or storage device or component that stores values of parameters. For example, the UPNP device can be included in or associated with a corresponding AP or other device to be controlled by the UPNP CP. The UPNP CP and the UPNP device are collectively referred to herein as a UPNP system. In such a case, the primary AP can be associated with a first UPNP system and the secondary APs can be associated with respective second UPNP systems.

When the primary AP is connected to the secondary APs via a backhaul wireless connection, such as for a mesh wireless network, transmitting operational data and control information via the wireless connection can use significant bandwidth. Also, secondary APs might not be configured to automatically perform onboarding with regard to the primary AP (e.g., to configure the one or more wireless networks to be provided by the secondary APs, to authenticate security information associated with the secondary APs, etc.). The physical WiFi backhaul network can be provided between primary and secondary AP by extensions to the layer-1 WiFi protocol.

Implementations described herein perform configuration of secondary APs using second UPNP systems associated with the secondary APs. A first UPNP system (associated with the primary AP) can subscribe to UPNP parameters, of the second UPNP systems, that are associated with providing a wireless network. For example, in some implementations, the first UPNP system does not subscribe to other parameters that are irrelevant to providing the wireless network, saving network and device resources that would otherwise be used to provide irrelevant parameters. Further, the first UPNP system can be associated with a limited local memory, and reducing the amount of parameters to process can reduce overflow of the limited local memory.

Additionally, implementations described herein can configure the second UPNP system to provide one or more wireless networks that are also provided by the primary AP, and can configure the second UPNP system to apply rules with regard to the one or more wireless networks, such as filtering rules. By configuring the second UPNP system to filter network traffic, network congestion, in the customer network, due to unfiltered traffic is reduced. Also, security of the customer network can be improved. For example, if a device on the customer network is unwanted, malicious, or compromised, filtering rules can be enforced by each UPNP system to prevent the device from accessing the customer network.

Additionally, implementations described herein can gather data regarding UPNP parameters, and can automatically (e.g., zero touch, without human intervention, etc.) identify remediation or configuration actions to perform based on UPNP parameters. The remediation or configuration actions can be identified based on local logic or based on a server device that stores and/or analyzes the UPNP parameters to determine the remediation or configuration actions. Thus, implementations described herein automatically improve network performance, of the customer network, and perform service assurance without human intervention (e.g., using a self healing network process).

Figure 1B:
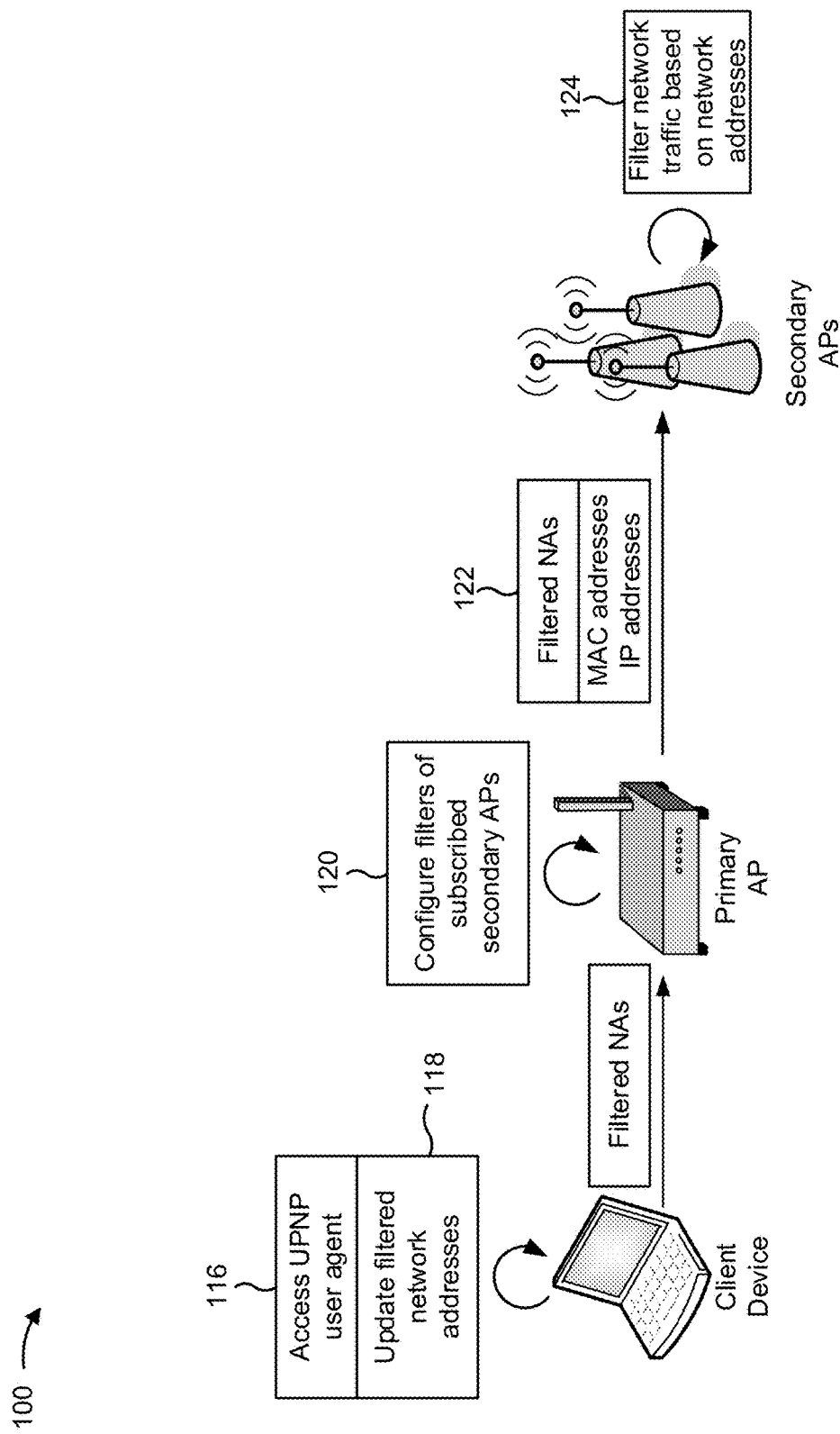
Figure 1C:
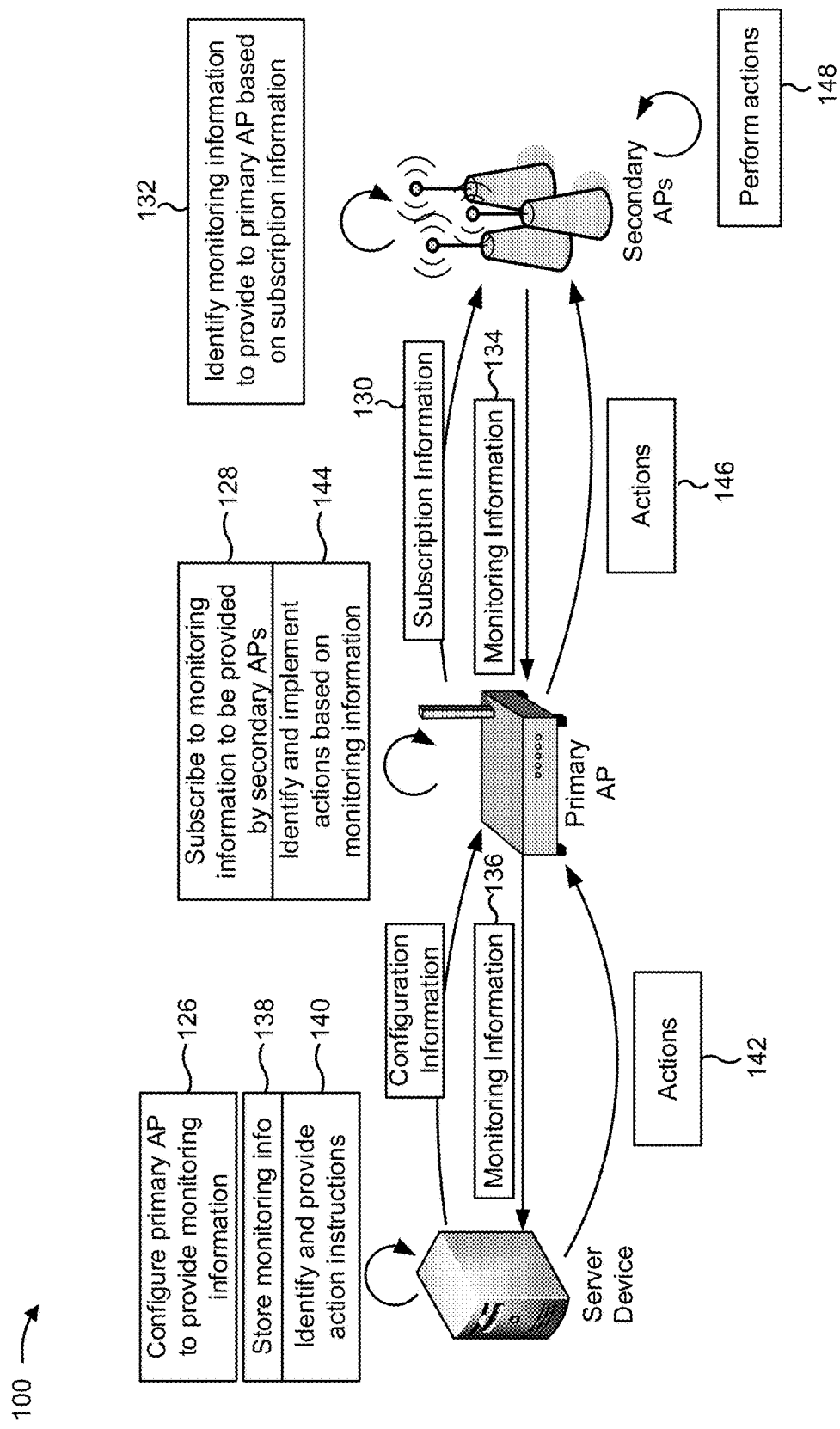

FIGS. 1A-1C are diagrams of an overview of an example implementation 100 described herein. As shown in FIG. 1A, a primary AP can be associated with a first UPNP system, and one or more secondary APs can be associated with corresponding second UPNP systems. For example, the respective APs can include the respective UPNP systems, can be connected to the respective UPNP systems, or the like. The respective UPNP systems can control the configuration and actions of the respective APs based on the UPNP protocol. In other words, the primary AP is a controlled device of a UPNP CP of the first UPNP system, and the one or more secondary APs are controlled devices of UPNP CPs of the corresponding one or more second UPNP systems.

As shown in FIG. 1A, and by reference number 102, a secondary AP can perform onboarding to provide access to one or more wireless networks that are provided. For example, the secondary AP can perform onboarding upon activation, upon connecting to a backhaul wireless network provided by the primary AP, upon receiving an advertisement from the first UPNP system, or the like. The secondary AP can perform the onboarding so the secondary AP is configured to provide access to the same wireless network or networks as the primary AP. For example, when properly configured, the secondary AP can act as a network extender of the primary AP.

As shown by reference number 104, the secondary AP can provide a subscribe request and a credential to the primary AP. For example, the second UPNP system associated with the secondary AP can cause the secondary AP to provide the subscribe request and the credential via a backhaul wireless network. The subscribe request and the credential can also be referred to herein as onboarding information. The secondary AP can provide the subscribe request to cause the first UPNP system to configure the second UPNP system and/or the secondary AP to provide access to the same wireless networks as the primary AP.

As shown by reference number 106, the first UPNP system can authenticate the credential, and can determine that authentication is successful. For example, the first UPNP system can authenticate the credential locally, or can provide the credential to another device for authentication. As shown by reference number 108, the first UPNP system can provide an acceptance message to the second UPNP system based on successfully authenticating the second UPNP system. For example, the acceptance message can be based on the UPNP protocol, and can indicate to the second UPNP system that the authentication is successful.

As shown by reference number 110, the first UPNP system can provide, to the second UPNP system, network information for active wireless networks provided by the primary AP. For example, as shown by reference number 112, the first UPNP system can provide service set identifiers (SSIDs) of the active wireless networks. In some implementations, the first UPNP system can provide other network information, such as security information for the active wireless networks, configuration information for the active wireless networks, or the like. Additionally, or alternatively, the first UPNP system can configure the second UPNP system to filter network traffic based on one or more rules, as described in more detail in connection with FIG. 1B, below.

As shown by reference number 114, the second UPNP system can cause the secondary AP to provide access to the active wireless networks based on the SSIDs. For example, the active wireless networks can include a 2.4 gigahertz (GHz) WiFi network, a 5 GHz WiFi network, a 60 GHz WiFi network (e.g., an 802.1 lad wireless network), a Bluetooth network, a backhaul wireless network, a wireless network for a particular device (e.g., an IP TV), and/or one or more other wireless networks. In some implementations, the first UPNP system can cause the second UPNP system to provide access to the active wireless networks based on the UPNP protocol, as described in more detail elsewhere herein. In this way, the secondary AP is automatically configured to provide access to the same wireless networks as the primary AP based on the UPNP protocol, which improves uniformity of mesh wireless networks, reduces human involvement, and improves network performance.

For the purpose of FIG. 1B, assume that the primary AP is associated with the first UPNP system and that the one or more secondary APs are associated with respective second UPNP systems (not shown). As shown by reference number 116, a client device can access a UPNP user agent. The UPNP user agent can provide access to a configuration and information interface for the first and/or second UPNP systems (e.g., UPNP devices of the first and/or second UPNP systems). For example, the client device can access the UPNP user agent via a wireless network provided by the primary AP and secondary AP(s), or via a remote connection (e.g., via a network other than the wireless network). Additionally, or alternatively, the client device can be associated with a technician or administrator (e.g., associated with a service provider) or can be associated with a customer for which the wireless network is provided.

As shown by reference number 118, the client device can update a set of filtered network addresses. For example, the client device can receive information identifying one or more addresses for which to apply a rule (e.g., drop traffic, redirect traffic, flag traffic, mirror traffic, etc.). The addresses can include, for example, Layer 2 network addresses (e.g., Media Access Control (MAC) network addresses), Layer 3 network addresses (e.g., Internet Protocol (IP) addresses), or another type of address (e.g., a device identifier, a web address, an email address, a phone number, etc.). As shown, the client device can provide information identifying the network addresses to be filtered to the primary AP (e.g., the first UPNP system).

As shown by reference number 120, the primary AP (e.g., first UPNP CP) can determine to configure filters of secondary APs that are subscribed to the primary AP (e.g., based on the onboarding process described in connection with FIG. 1A, above). For example, after performing onboarding of the second UPNP system and secondary APs, the second UPNP systems and secondary APs can be subscribed to the primary AP using the UPNP protocol. Therefore, the primary AP can automatically reconfigure the secondary APs based on configuration changes with regard to the wireless networks provided by the primary AP and the secondary APs.

As shown by reference number 122, to reconfigure the secondary APs, the primary AP can provide the network addresses to be filtered to the secondary APs. In some implementations, the primary AP can provide the network addresses using the UPNP protocol to cause the secondary APs to be reconfigured, as described in more detail elsewhere herein.

As shown by reference number 124, the secondary APs (e.g., second UPNP systems) can filter network traffic based on the identified network addresses. For example, the second UPNP systems can cause the secondary APs to enforce the filters with regard to the identified network addresses, or can process network traffic to enforce the filters. In this way, the secondary APs are automatically (e.g., zero touch, without human intervention) reconfigured, by the first UPNP system and the corresponding second UPNP system, to enforce a filter with regard to one or more wireless networks. Thus, network security is improved, human intervention is reduced, and resilience of the mesh network is improved.

FIG. 1C shows an example of collecting monitoring information relating to providing the wireless networks described in connection with FIGS. 1A and 1B, and identifying and performing actions based on the monitoring information. As shown in FIG. 1C, and by reference number 126, a server device can configure the primary AP (e.g., the first UPNP system) to provide monitoring information. The monitoring information can include information relating to providing the wireless networks that the first UPNP system configures the second UPNP systems and secondary APs to provide. As shown, to configure the primary AP (e.g., the first UPNP system) to provide the monitoring information, the server device can provide configuration information to the primary AP (e.g., based on a UPNP protocol, as described in more detail elsewhere herein).

As shown by reference number 128, the primary AP (e.g., the first UPNP system) can subscribe to the monitoring information to be provided by the secondary APs. For example, each UPNP system can be associated with an event and notification system. The event and notification system can determine when a parameter value of the UPNP system or a controlled device has changed, and can transmit a notification, to devices that subscribe to notifications of the UPNP system, identifying the change. In some cases, a device can subscribe to all notifications transmitted by a particular UPNP system. For example, an unextended or default UPNP protocol can allow for subscription to every update provided by the particular UPNP system. However, this can lead to large amounts of data transmission between UPNP systems and subscribed devices. While such large amounts of data might not be problematic in a wired or Ethernet network, when using a backhaul wireless network (as between the primary AP and the secondary APs), such large amounts of data can overload the backhaul wireless network.

Implementations described herein use a selective subscription extension of the UPNP framework so that the first UPNP system can subscribe to relevant parameters, of the secondary APs and/or second UPNP systems, that are relevant to providing the one or more wireless networks. For example, the first UPNP system can provide information identifying the relevant parameters to the second UPNP system. When the second UPNP system determines that one of the relevant parameters has changed, the second UPNP system can provide, to the first UPNP system, information identifying the changed value. When another parameter (e.g., not a relevant parameter) changes, the second UPNP system does not provide such information to the first UPNP system regarding the other parameter. Thus, the second UPNP system selectively provides information regarding changed parameters, thus improving network efficiency and reducing processor usage of the first UPNP system and the second UPNP system.

As shown by reference number 130, the primary AP can provide subscription information to the secondary APs. The subscription information can identify the relevant parameters. In some implementations, the subscription information can include control information and/or can be transmitted to a particular network address or web address that is associated with configuring the second UPNP system based on the UPNP protocol.

As shown by reference number 132, the secondary APs can identify monitoring information to provide to the primary AP (e.g., the first UPNP system) based on the subscription information. The monitoring information can identify changed values of the relevant parameters. As shown by reference number 134, the secondary APs (e.g., the second UPNP systems) can provide the monitoring information to the primary AP (e.g., the first UPNP system). In some implementations, the secondary APs can provide the monitoring information each time a relevant parameter changes. Additionally, or alternatively, the secondary APs can provide information identifying multiple changed values in a batch (e.g., periodically, regularly, when a particular quantity of changed values has been obtained, etc.). Additionally, or alternatively, the secondary APs can provide the monitoring information when a changed value satisfies a threshold (e.g., a threshold length of time since a last change, a threshold magnitude of the change, etc.). In this way, the secondary APs conserve network resources that would otherwise be used to provide more frequent monitoring information. As shown by reference number 136, the primary AP can provide the monitoring information to the server device.

As shown by reference number 138, the server device can store the monitoring information, which can conserve storage space of the first UPNP system that would otherwise be used to store the monitoring information. In some implementations, the primary AP can locally store the monitoring information, which can permit the primary AP (e.g., the first UPNP system) to locally identify actions to perform.

As shown by reference number 140, the server device can identify actions to perform, and can provide instructions identifying the actions to perform. An action can include any action to reconfigure or improve performance of the one or more wireless networks provided by the primary AP and the one or more secondary APs. For example, an action can include activating or deactivating an AP, changing a channel of a wireless network, blacklisting one or more devices, whitelisting one or more devices, increasing or decreasing an allowable bandwidth of an AP, increasing or decreasing a quantity of devices allowed to connect to a particular AP, or a similar action. As shown by reference number 142, the server device can provide information identifying the actions to the primary AP (e.g., the first UPNP system).

As shown by reference number 144, in some cases, the primary AP (e.g., the first UPNP system) can identify and implement the actions based on the monitoring information. For example, the first UPNP system can store rules identifying actions to perform when the monitoring information satisfies particular criteria, and can use the rules to identify the actions to perform. Additionally, or alternatively, the primary AP can identify and implement the actions based on the remediation instructions received from the server device, which can conserve processor resources of the primary AP. Further, when the server device identifies the actions to perform, the server device can do so based on a larger body of data than the first UPNP system. For example, storage resources of the first UPNP system can be limited, whereas the server device can store a larger or arbitrary amount of monitoring information as compared to the first UPNP system, as well as storing monitoring information for multiple different wireless networks, which can improve usefulness and effectiveness of actions identified by the server device.

As shown by reference number 146, the primary AP can provide information identifying the actions to the secondary APs. As shown by reference number 148, the secondary APs (e.g., second UPNP system) can perform the actions. In this way, the primary AP and secondary APs perform self healing operations based on selectively monitoring parameters of the secondary APs, which improves network performance and resilience while decreasing the amount of data regarding parameters to be transmitted over the one or more wireless networks. Thus, a self healing mesh network can be realized using the UPNP protocol.

As indicated above, FIGS. 1A-1C are provided merely as an example. Other examples are possible and can differ from what was described with regard to FIGS. 1A-1C.

Figure 2:
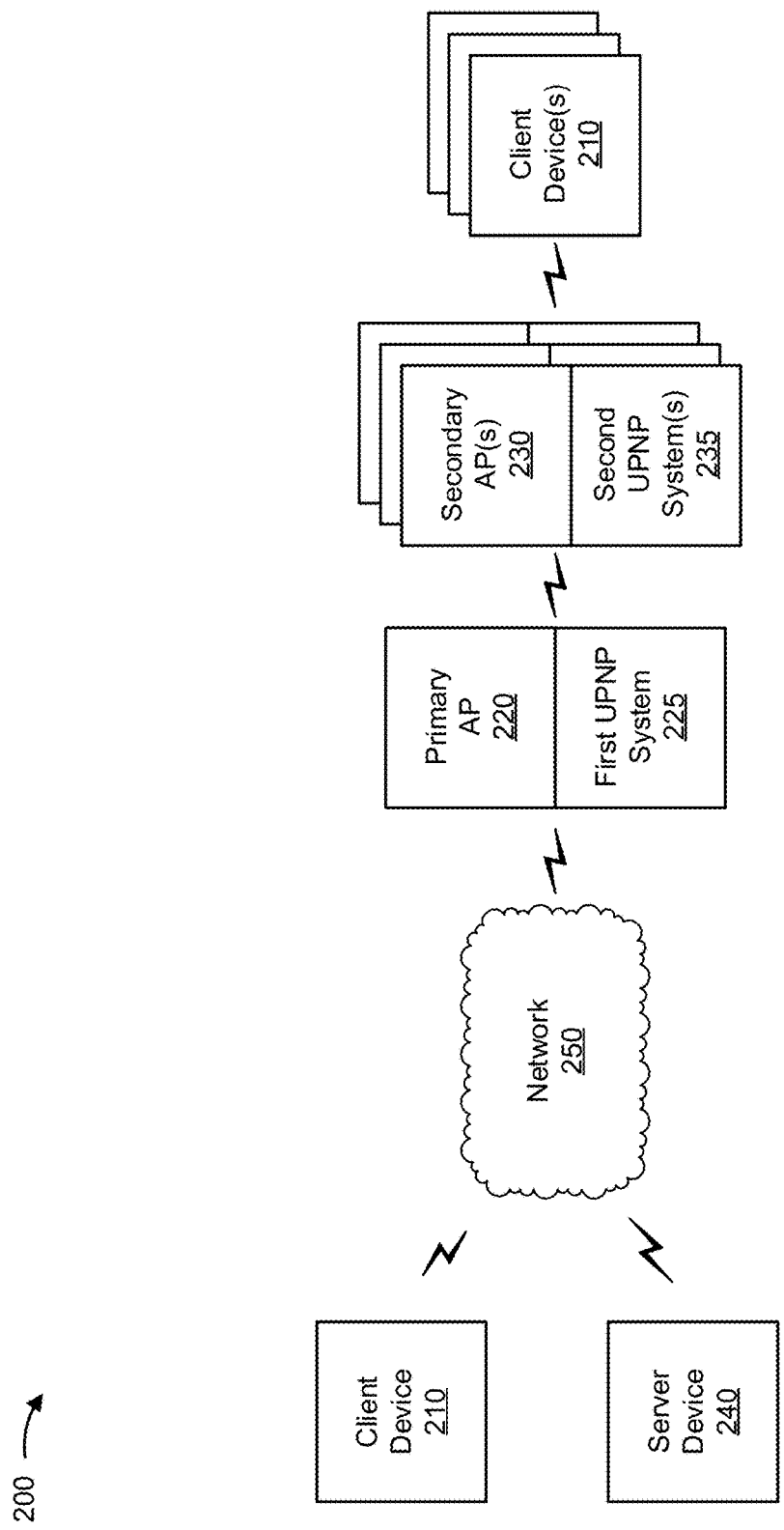
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include one or more client devices 210, a primary access point (AP) 220, a first UPNP system 225, one or more secondary AP(s) 230, one or more second UPNP systems 235, a server device 240, and a network 250. Devices of environment 200 can interconnect via wired connections, wireless connections, or a combination of wired and wireless connections.

Client device 210 includes one or more devices capable of receiving, generating, storing, processing, and/or providing information associated with configuring primary access point 220, first UPNP system 225, secondary access point 230, and/or second UPNP system 235. For example, client device 210 can include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device.

Primary AP 220 includes one or more devices capable of providing access to a wireless local area network, such as a router, a gateway, a modem, a base station, an access point, or the like. In some implementations, primary AP 220 can act as a gateway between a customer network (e.g., a wireless local area network provided by the primary AP 220 and/or one or more secondary APs 230) and an external network (e.g., a wide area network, the Internet, etc.). In some implementations, primary AP 220 can be associated with first UPNP system 225, as described in more detail below. For example, primary AP 220 can be controlled by or configured by first UPNP system 225. In some implementations, primary AP 220 can communicate with secondary AP 230 via a wireless connection, such as a backhaul wireless network that is primarily used for communications between primary AP 220 (e.g., and/or first UPNP system 225) and secondary APs 230 (e.g., and/or second UPNP systems 235). In such a case, the backhaul wireless network can be hidden from end users.

Secondary AP 230 includes one more devices capable of providing access to a wireless local area network. For example, secondary AP 230 can include a router, a WiFi extender, or the like. In some implementations, secondary AP 230 can provide access to one or more wireless networks provided by primary AP 220. In some implementations, secondary AP 230 can communicate with primary AP 220 via a wireless connection, such as a backhaul wireless connection. In some implementations, secondary AP 230 can be associated with second UPNP system 235, as described in more detail below. For example, secondary AP 230 can be controlled by or configured by second UPNP system 235.

Primary AP 220 and secondary AP 230 can include or be associated with first UPNP system 225 and second UPNP system 235, respectively. A UPNP system, as described herein, includes one or more of a UPNP CP, a UPNP device (e.g., a controlled device), or an access point (e.g., primary AP 220 and/or secondary AP 230). A UPNP CP is a device or application that uses UPNP protocols to control UPNP controlled devices. The UPNP CP can configure or control a corresponding controlled device, identifying actions to be performed based on parameters associated with a controlled device, and transmitting parameter values to other UPNP systems (e.g., via primary AP 220 or secondary AP 230). In some cases, a UPNP system can perform discovery and onboarding operations when connected to a customer network. For example, the UPNP system can automatically (e.g., zero-touch, without human intervention, etc.) discover other UPNP CPs or controlled devices, and can advertise capabilities of the UPNP CP or a corresponding controlled device to the other UPNP CPs or controlled devices. In some implementations, the controlled devices may store parameter information (e.g., a data model), and may provide parameter values according to the parameter information.

Server device 240 includes one or more devices capable of storing, processing, and/or routing information associated with wireless APs or UPNP systems. In some implementations, server device 240 can include a communication interface that allows server device 240 to receive information from and/or transmit information to other devices in environment 200.

Network 250 includes one or more wired and/or wireless networks. For example, network 250 can include a cellular network (e.g., a long-term evolution (LTE) network, an LTE-Advanced (LTE-A or LTE+) network, a code division multiple access (CDMA) network, a 2G network, a 3G network, a 4G network, a 5G network, another type of advanced generated network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
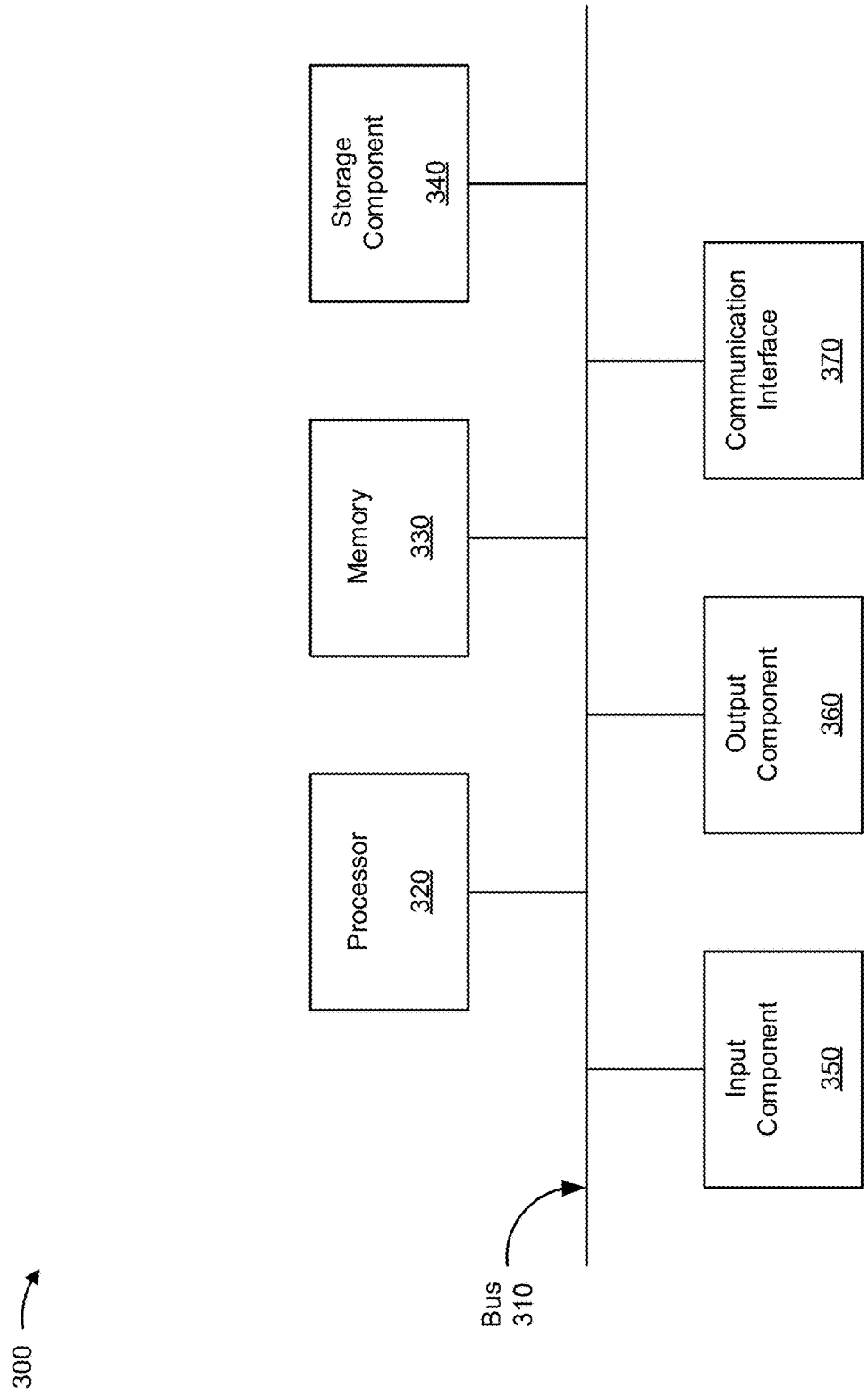
FIG. 3 is a diagram of example components of one or more devices of FIG. 2.

FIG. 3 is a diagram of example components of a device 300. Device 300 can correspond to client device 210, primary AP 220, first UPNP system 225, secondary AP 230, second UPNP system 235, and/or server device 240. In some implementations, client device 210, primary AP 220, first UPNP system 225, secondary AP 230, second UPNP system 235, and/or server device 240 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a Wi-Fi interface, a cellular network interface, or the like.

Device 300 can perform one or more processes described herein. Device 300 can perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
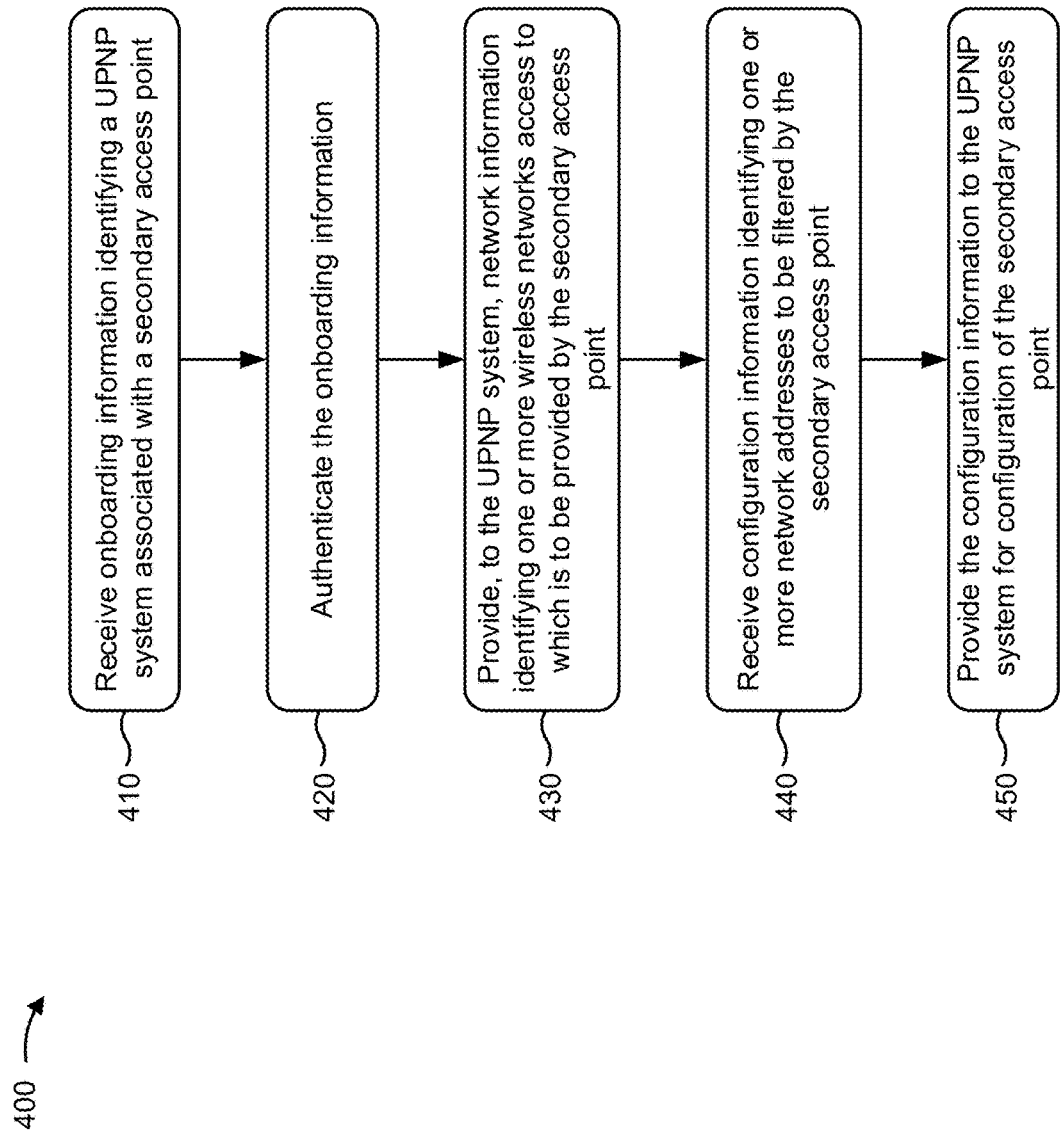
FIG. 4 is a flow chart of an example process for configuring one or more secondary access points to provide access to a wireless network using UPNP.

FIG. 4 is a flow chart of an example process 400 for configuring one or more secondary access points to provide access to a wireless network using UPNP. In some implementations, one or more process blocks of FIG. 4 can be performed by primary AP 220 and/or first UPNP system 225. In some implementations, one or more process blocks of FIG. 4 can be performed by another device or a group of devices separate from or including primary AP 220 and/or first UPNP system 225, such as client device 210, secondary AP 230, second UPNP system 235, and server device 240. As used herein, first UPNP system 225 can refer to a UPNP CP associated with primary AP 220, a controlled device associated with primary AP 220, primary AP 220, or a combination of the above. Similarly, second UPNP system 235 can refer to a UPNP CP associated with secondary AP 230, a controlled device associated with secondary AP 230, secondary AP 230, or a combination of the above.

As shown in FIG. 4, process 400 can include receiving onboarding information identifying a UPNP system associated with a secondary access point (block 410). For example, first UPNP system 225 can receive onboarding information that identifies a second UPNP system 235 associated with secondary AP 230. First UPNP system 225 can receive the onboarding information based on activation or configuration of secondary AP 230. For example, second UPNP system 235 can provide an advertisement that includes the onboarding information based on connecting to a customer network or backhaul wireless network provided by or associated with primary AP 220. In such a case, second UPNP system 235 can provide the advertisement via the backhaul wireless network. In some implementations, first UPNP system 225 can receive onboarding information from multiple, different second UPNP systems 235 or secondary APs 230. For example, as secondary APs 230 are connected to the customer network or backhaul wireless network, first UPNP system 225 can receive onboarding information from each connected secondary AP 230.

The onboarding information can include information identifying secondary AP 230 (e.g., a network address, a device identifier, protocol information such as a communication protocol to use, etc.), information identifying second UPNP system 235 (e.g., a network address, a device identifier, protocol information, etc.), an alive message indicating that second UPNP system 235 is connected to the customer network (e.g., a UPNP alive message that is automatically transmitted when connecting to a new network), or the like. In some implementations, the onboarding information can identify a control uniform resource locator (URL) of second UPNP system 235. First UPNP system 225 or another device can configure second UPNP system 235 based on transmitting configuration information or instructions to the control URL.

In some implementations, onboarding information can include a credential. The credential can include any information used to validate or authenticate secondary AP 230 (e.g., a key, a token, a password, information identifying secondary AP 230 and/or second UPNP system 235, etc.). The credential can enable authentication of secondary AP 230, thereby improving security of the customer network.

As further shown in FIG. 4, process 400 can include authenticating the onboarding information (block 420). For example, first UPNP system 225 can authenticate (or validate) the onboarding information to determine whether second UPNP system 235 and/or secondary AP 230 is permitted to provide access to the one or more wireless networks provided by primary AP 220. In some implementations, first UPNP system 225 can authenticate the onboarding information based on the credential received with the onboarding information. For example, first UPNP system 225 can authenticate the onboarding information based on decrypting the credential, based on transmitting the credential to server device 240 for authentication or validation, or the like. In this way, first UPNP system 225 improves security of the customer or backhaul wireless network and prevents unauthorized UPNP systems from accessing the customer or backhaul wireless network.

As further shown in FIG. 4, process 400 can include providing, to the secondary access point, network information identifying one or more wireless networks access to which is to be provided by the secondary access point (block 430). For example, when authentication of second UPNP system 235 is successful, first UPNP system 225 can provide network information identifying one or more wireless networks to second UPNP system 235. The one or more wireless networks can be provided by primary AP 220/first UPNP system 225, and first UPNP system 225 can provide the information identifying the one or more wireless networks to permit secondary AP 230/second UPNP system 235 to provide access to the one or more wireless networks. In this way, mesh networking via UPNP-controlled wireless access points is realized. In some implementations, first UPNP system 225 can provide configuration information identifying parameters of secondary AP 230 and/or second UPNP system 235 to monitor, as described in more detail in connection with FIG. 5, below.

The information identifying the one or more wireless networks can include information identifying SSIDs of the one or more wireless networks, security information associated with the one or more wireless networks (e.g., information identifying a security protocol associated with the one or more wireless networks or an access credential for providing access to the one or more wireless networks), information identifying a network protocol for providing the one or more wireless networks (e.g., WiFi, Bluetooth, etc.), transmission information (e.g., channels, signal strength, etc.), or the like.

In some implementations, first UPNP system 225 can provide the network information via a control channel or to a control URL associated with the second UPNP system 235. For example, the second UPNP system 235 can be associated with a control URL. When configuration information (e.g., network information, etc.) is received in association with the control URL, second UPNP system 235 can implement the configuration information. In such a case, the network information can be formatted according to UPNP formatting rules to enable second UPNP system 235 to understand the network information. In this way, first UPNP system 225 automatically configures second UPNP system 235 (and therefore secondary AP 230) to provide the same wireless network or networks as primary AP 220, thereby improving coverage of primary AP 220 and enabling mesh networking using UPNP.

In some implementations, second UPNP system 235 can subscribe to network information to be provided by first UPNP system 225. For example, the network information for the wireless networks provided by primary AP 220 and secondary AP 230 can change. In such a case, secondary AP 230 might need to modify the network information to continue properly providing the wireless networks. Therefore, second UPNP system 235 can subscribe to the network information to be provided by first UPNP system 225 based on the UPNP event and notification protocol. In some implementations, second UPNP system 235 can subscribe to only the particular parameters associated with the network information based on an extension to the UPNP protocol, as described in more detail in connection with FIGS. 1C and 5. In this way, second UPNP system 235 can be provided with updated network information based on an extension to the UPNP protocol, which improves network resilience and reduces human interaction in the network configuration process.

As further shown in FIG. 4, process 400 can include receiving configuration information identifying one or more network addresses to be filtered by the secondary access point (block 440). For example, first UPNP system 225 can receive or determine configuration information identifying one or more network addresses to be filtered by secondary AP 230 and/or second UPNP system 235. The one or more network addresses can include IP addresses, MAC addresses, device identifiers, email addresses, web addresses, or any similar network address.

In some implementations, first UPNP system 225 can receive configuration information from client device 210. For example, client device 210 can provide the configuration information via a UPNP system agent or configuration interface. In such a case, client device 210 can be connected to one of the wireless networks provided by first UPNP system 225, or can be remote from first UPNP system 225. For example, a technician or another user can specify configuration information remotely (e.g., using an administration interface or device).

In some implementations, first UPNP system 225 can automatically determine the configuration information. For example, first UPNP system 225 can store information identifying criteria for filtering network address, and can add network addresses to a filtered address list according to the criteria. In some implementations, first UPNP system 225 can filter adult websites, particular types of network traffic, websites that use a threshold amount of data, or the like. Thus, first UPNP system 225 automatically identifies filtering rules for network traffic, thereby reducing human intervention and improving functioning of the one or more wireless networks provided by primary AP 220 and secondary AP 230.

In some implementations, first UPNP system 225 can receive another type of configuration information. For example, first UPNP system 225 can receive information identifying device identifiers to be filtered by second UPNP system 235, bandwidth throttles to be implemented by second UPNP system 235, device types to prevent from connecting to the one or more wireless networks, or the like. This can enable further configuration of operation of secondary AP 230/second UPNP system 235 based on the configuration information, thereby improving performance of the one or more wireless networks.

As further shown in FIG. 4, process 400 can include providing the configuration information to the secondary access point (block 450). For example, first UPNP system 225 can provide the configuration information to the second UPNP system 235 for configuration of secondary AP 230 based on the configuration information. In some implementations, first UPNP system 225 can provide the configuration information based on the UPNP protocol. For example, first UPNP system 225 can provide the configuration information in association with a control URL associated with second UPNP system 235 to cause second UPNP system 235 to implement the configuration information on secondary AP 230. In some implementations, the configuration information can be formatted based on a particular protocol, such as the UPNP protocol, the Simple Object Access Protocol (SOAP), or the like.

Second UPNP system 235 and/or secondary AP 230 can provide access to one or more wireless networks based on the configuration information. For example, secondary AP 230 can establish connections with client devices 210, and can provide network traffic to and from the client devices 210 via primary AP 220. Further, secondary AP 230 and/or second UPNP system 235 can filter the network traffic based on the rules associated with the network addresses provided in the configuration information. In this way, a customer mesh network is realized using UPNP systems and wireless APs that are automatically configured using the UPNP protocol.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

Figure 5:
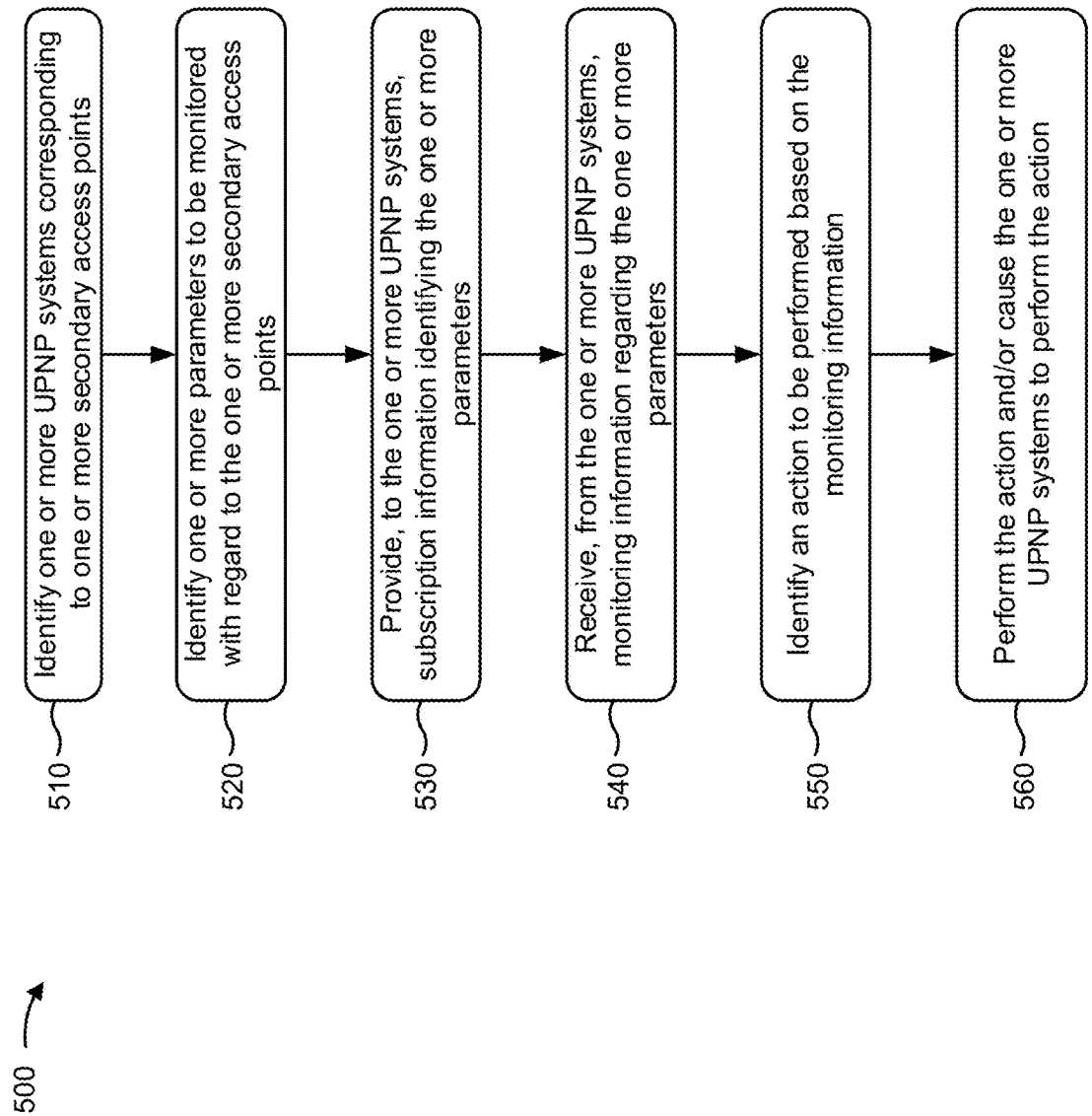
FIG. 5 is a flow chart of an example process for identifying an action and causing one or more secondary access points to perform the action using UPNP.

FIG. 5 is a flow chart of an example process 500 for identifying an action and causing one or more secondary access points to perform the action using UPNP. In some implementations, one or more process blocks of FIG. 5 can be performed by primary AP 220 and/or first UPNP system 225. In some implementations, one or more process blocks of FIG. 5 can be performed by another device or a group of devices separate from or including primary AP 220 and/or first UPNP system 225, such as client device 210, secondary AP 230, second UPNP system 235, and server device 240.

As shown in FIG. 5, process 500 can include identifying one or more secondary access points (block 510). For example, first UPNP system 225 can identify one or more second UPNP systems 235 corresponding to one or more secondary APs 230. In some implementations, first UPNP system 225 can identify the one or more second UPNP systems 235 based on the onboarding and configuration process described in connection with FIG. 4, above. For example, when the one or more second UPNP systems 235 are onboarded with regard to first UPNP system 225, first UPNP system 225 can determine to monitor particular parameters associated with the one or more second UPNP systems 235. Additionally, or alternatively, first UPNP system 225 may identify the one or more second UPNP systems 235 based on one or more advertisements transmitted by first UPNP system 225 or the one or more second UPNP systems 235, or the like.

As further shown in FIG. 5, process 500 can include identifying one or more parameters to be monitored with regard to the one or more secondary access points (block 520). For example, first UPNP system 225 can identify one or more parameters to be monitored with regard to the one or more secondary APs 230. The one or more parameters can relate to providing or maintaining a wireless network, as described in more detail below. First UPNP system 225 can monitor the one or more parameters to improve performance of one or more wireless networks provided by primary AP 220 and secondary APs 230. For example, first UPNP system 225 or another device (e.g., server device 240) can determine actions to perform based on values of the one or more parameters to improve performance of the one or more wireless networks.

In some implementations, first UPNP system 225 can identify the one or more parameters based on information received from another device, such as server device 240. For example, server device 240 can provide information identifying the one or more parameters to cause first UPNP system 225 to monitor the one or more parameters. In some implementations, first UPNP system 225 can identify the one or more parameters based on information stored by first UPNP system 225. For example, first UPNP system 225 can be configured to monitor the one or more parameters by default.

In some implementations, the one or more parameters can identify a physical layer data rate, channel occupancy information, one or more received signal strength indicator (RSSI) values (e.g., one RSSI value for each wireless network provided by secondary AP 230, an average value of each RSSI value associated with a particular network provided by secondary AP 230, an average value of RSSI values for each wireless network provided by secondary AP 230, etc.), a transmit opportunity (TXOP) value that identifies available air time associated with secondary AP 230, a packet error rate or another error rate measurement, an operating channel of one or more wireless networks provided by secondary AP 230, a noise floor of one or more wireless networks provided by secondary AP 230, or the like.

As further shown in FIG. 5, process 500 can include providing subscription information identifying the one or more parameters (block 530). For example, first UPNP system 225 can provide subscription information to the one or more second UPNP systems 235. The subscription information can identify the one or more parameters for which the one or more second UPNP systems 235 are to provide notifications. For example, the UPNP protocol can provide an event notification protocol wherein a UPNP system detects a change in a parameter and broadcasts information identifying the change in the parameter to subscribed devices. In traditional UPNP, a device might subscribe to all updates provided by a UPNP system, and updates might not be targeted to particular subscribed devices. This can consume significant network resources.

Implementations described herein can provide a mechanism to subscribe to updates of particular parameters, rather than subscribing to updates regarding all parameters associated with a UPNP device. For example, first UPNP system 225 can subscribe to updates regarding parameters relevant to providing or configuring a wireless network. Second UPNP system 235 can provide updates regarding changed values of the parameters relevant to providing or configuring a wireless network, and not other parameters, which conserves network resources and processor resources of first UPNP system 225 and second UPNP system 235 that would otherwise be used to provide and process irrelevant parameters.

First UPNP system 225 can use an extension of the UPNP protocol to selectively subscribe to particular parameters of secondary APs 230 and/or second UPNP systems 235. For example, the extension of the UPNP protocol can define formatting of the subscription information so that second UPNP system 235 monitors and provides updates regarding the particular parameters. In some implementations, when first UPNP system 225 provides subscription information using the formatting associated with the extension of the UPNP protocol, and when second UPNP system 235 is not configured to process the formatting associated with the extension of the UPNP protocol, second UPNP system 235 can ignore the subscription information. For example, second UPNP system 235 can provide updates for all parameters of second UPNP system 235 or might not provide updates for parameters of second UPNP system 235. In this way, backward compatibility of the extension of the UPNP protocol is improved.

As further shown in FIG. 5, process 500 can include receiving, from the one or more UPNP systems, monitoring information regarding the one or more parameters (block 540). For example, first UPNP system 225 can receive monitoring information regarding the one or more parameters from second UPNP system 235 (e.g., from second UPNP system 235 associated with secondary AP 230). In some implementations, first UPNP system 225 can receive the monitoring information as values, of the one or more parameters, change. For example, an event notification process associated with second UPNP system 235 can detect changes of the one or more parameters, and can provide information identifying the changes as the monitoring information. Additionally, or alternatively, first UPNP system 225 can receive data regarding multiple, different changes at once, as described in connection with reference number 132 of FIG. 1C, above.

As further shown in FIG. 5, process 500 can include identifying an action to be performed based on the monitoring information (block 550). For example, first UPNP system 225 can identify an action to be performed based on the monitoring information. The action can include an action to be performed by primary AP 220, first UPNP system 225, secondary AP 230, and/or second UPNP system 235. In some implementations, first UPNP system 225 can determine the action to be performed based on locally stored information, such as a locally implemented rules engine and/or locally stored monitoring information. The action can include, for example, activating or deactivating an AP, changing a channel of a wireless network, blacklisting one or more devices, whitelisting one or more devices, increasing or decreasing an allowable bandwidth of an AP, increasing or decreasing a quantity of devices allowed to connect to a particular AP, or a combination of any of the listed actions. These actions are simply examples of actions that can be performed. Other actions are possible in practice.

In some implementations, first UPNP system 225 can receive information identifying the action from server device 240. For example, first UPNP system 225 can provide monitoring information to server device 240 for storage and/or analysis. This can be beneficial when first UPNP system 225 lacks long-term local storage or has limited local storage resources. Server device 240 can identify actions to be performed by first UPNP system 225 and/or second UPNP system 235 based on the monitoring information.

In some implementations, server device 240 can identify an action based on historical information associated with first UPNP system 225 and/or second UPNP system 235. Additionally, or alternatively, server device 240 can identify the action based on historical information associated with other customer networks. For example, server device 240 can identify actions that have previously improved network performance of first UPNP system 225 and/or second UPNP system 235, or the other customer networks, and can provide information identifying the actions to first UPNP system 225. In some implementations, server device 240 can perform such a determination based on a machine learning algorithm, an artificial intelligence algorithm, a big data technique, or the like. For example, server device 240 can train a model, based on a machine learning algorithm, to output information identifying actions to perform based on monitoring information. Server device 240 can update or refine the model based on observations regarding which actions improve network performance. In this way, server device 240 improves network performance and automatically identifies actions to perform based on the monitoring information.

As further shown in FIG. 5, process 500 can include performing the action and/or causing the one or more secondary access points to perform the action (block 560). For example, first UPNP system 225 can perform the action and/or can cause secondary AP 230 (e.g., second UPNP system 235) to perform the action. In some implementations, first UPNP system 225 can configure primary AP 220 based on the action (e.g., can change a bandwidth associated with primary AP 220, can change a quantity of devices permitted to connect to primary AP 220, etc.). Additionally, or alternatively, first UPNP system 225 can provide information identifying the action to second UPNP system 235, and second UPNP system 235 can configure secondary AP 230 (e.g., can change a bandwidth associated with secondary AP 230, can change a quantity of devices permitted to connect to secondary AP 230, etc.). Additionally, or alternatively, first UPNP system 225 can configure second UPNP system 235 based on the information (e.g., can activate or deactivate second UPNP system 235, can change security information associated with second UPNP system 235, can change a filtered network address list of second UPNP system 235, etc.).

In this way, UPNP systems enable automatic onboarding and configuration of secondary access points using UPNP, which improves network resilience and reduces human intervention in the network configuration process. Further, a first UPNP system may automatically monitor relevant parameters of second UPNP systems, may aggregate and store the relevant parameters, and may automatically identify actions to perform with regard to the second UPNP systems, which further improves network performance and reduces human intervention.

Although FIG. 5 shows example blocks of process 500, in some implementations, process 500 can include additional blocks, fewer blocks, different blocks, or differently arranged blocks than those depicted in FIG. 5. Additionally, or alternatively, two or more of the blocks of process 500 can be performed in parallel.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

Some implementations are described herein in connection with thresholds. As used herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface can include a graphical user interface, a non-graphical user interface, a text-based user interface, etc. A user interface can provide information for display. In some implementations, a user can interact with the information, such as by providing input via an input component of a device that provides the user interface for display. In some implementations, a user interface can be configurable by a device and/or a user (e.g., a user can change the size of the user interface, information provided via the user interface, a position of information provided via the user interface, etc.). Additionally, or alternatively, a user interface can be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A first Universal Plug and Play (UPNP) system, comprising:
one or more memories; and
one or more processors, communicatively coupled to the one or more memories, to:
receive information identifying a second UPNP system based on an advertisement transmitted by the first UPNP system;
configure the second UPNP system based on the information identifying the second UPNP system,
the first UPNP system being associated with a first wireless access point and the second UPNP system being associated with a second wireless access point,
the first UPNP system being different from the second UPNP system,
the first wireless access point being different from the second wireless access point, and
the one or more processors, when configuring the second UPNP system, are to:

configure the second UPNP system to provide access to one or more wireless networks via the second wireless access point, and
configure the second UPNP system to filter network traffic based on a set of network addresses or rules;
identify, from a plurality of parameters, one or more parameters to be monitored with regard to the second UPNP system, the one or more parameters identifying at least one of:
a physical layer data rate,
data indicating channel occupancy,
an operating channel associated with the second UPNP system,
one or more received signal strength indicator (RSSI) values,
data identifying available air time associated with the second UPNP system,
an error rate, or
a noise value associated with the second UPNP system;
provide, to the second UPNP system and using a UPNP protocol, information identifying the one or more parameters to be monitored, the information identifying the one or more parameters to be monitored including data that causes the second UPNP system to monitor the one or more parameters;
receive, from the second UPNP system and based on the UPNP protocol, a value associated with at least one of the one or more parameters;
identify an action to be performed based on the value associated with the at least one of the one or more parameters; and
perform the action, or cause the second UPNP system to perform the action, using the UPNP protocol.

2. The first UPNP system of claim 1, where the one or more processors, when providing the information identifying the one or more parameters to be monitored, are to:
provide the information identifying the one or more parameters via a wireless network other than the one or more wireless networks; and
where the one or more processors, when receiving the value associated with the at least one of the one or more parameters, are to:
receive the value associated with the at least one of the one or more parameters via the wireless network other than the one or more wireless networks.

3. The first UPNP system of claim 1, where the one or more processors, when receiving the value associated with the at least one of the one or more parameters, are to:
receive the value associated with the at least one of the one or more parameters based on the value of the one or more parameters changing.

4. A non-transitory computer-readable medium storing instructions, the instructions comprising:
one or more instructions that, when executed by one or more processors of a first Universal Plug and Play (UPNP) system, cause the one or more processors to:
receive information identifying a second UPNP system based on an advertisement transmitted by the first UPNP system;
configure the second UPNP system based on the information identifying the second UPNP system,
the first UPNP system being associated with a first wireless access point and the second UPNP system being associated with a second wireless access point, the first UPNP system being different from the second UPNP system, and the first wireless access point being different from the second wireless access point, the one or more instructions, that cause the one or more processors to configure the second UPNP system, cause the one or more processors to:

configure the second UPNP system to provide access to one or more wireless networks via the second wireless access point, and configure the second UPNP system to filter network traffic based on a set of network addresses or rules;

identify, from a plurality of parameters, one or more parameters to be monitored with regard to the second UPNP system, the one or more parameters identifying at least one of:

a physical layer data rate, data indicating channel occupancy, an operating channel associated with the second UPNP system, one or more received signal strength indicator (RSSI) values, data identifying available air time associated with the second UPNP system, an error rate, or a noise value associated with the second UPNP system;

provide, to the second UPNP system and using a UPNP protocol, information identifying the one or more parameters to be monitored, the information identifying the one or more parameters to be monitored including data that causes the second UPNP system to monitor the one or more parameters;

receive, from the second UPNP system and using the UPNP protocol, a value associated with at least one of the one or more parameters;

identify an action to be performed based on the value associated with the at least one of the one or more parameters; and perform the action, or cause the second UPNP system to perform the action, using the UPNP protocol.

5. The non-transitory computer-readable medium of claim 4, where the one or more instructions, that cause the one or more processors to identify the action to be performed, cause the one or more processors to:

identify the action to be performed based on one or more locally stored rules that identify actions to be performed based on values of the one or more parameters.

6. The non-transitory computer-readable medium of claim 4, where the one or more instructions, when executed by the one or more processors, cause the one or more processors to:

provide the value associated with the at least one of the one or more parameters for storage or analysis; and where the one or more instructions, that cause the one or more processors to identify the action to be performed, cause the one or more processors to:

receive information identifying the action to be performed.

7. The non-transitory computer-readable medium of claim 4, where the one or more parameters further identify at least one of:

a transmit opportunity value that identifies available air time associated with the second UPNP system, an average RSSI value of the second UPNP system, a packet error rate associated with the second UPNP system, or a noise floor of the second UPNP system.

8. The non-transitory computer-readable medium of claim 4, where the first UPNP system communicates with the second UPNP system via a wireless network provided by the first wireless access point or the second wireless access point.

9. The non-transitory computer-readable medium of claim 4, where the one or more instructions, when executed by the one or more processors, further cause the one or more processors to:

cause the second UPNP system to configure the second wireless access point to extend a range of a wireless network provided by the first wireless access point.

10. The non-transitory computer-readable medium of claim 4, where the one or more instructions, that cause the one or more processors to receive the value associated with the at least one of the one or more parameters, cause the one or more processors to:

receive the value associated with the at least one of the one or more parameters based on values of the one or more parameters changing.

11. A method, comprising:

receiving, by a first Universal Plug and Play (UPNP) system and based on an advertisement transmitted by the first UPNP system, information identifying a second UPNP system, the first UPNP system being associated with a first wireless access point and the second UPNP system being associated with a second wireless access point, the first UPNP system being different from the second UPNP system, and the first wireless access point being different from the second wireless access point;

configuring, by the first UPNP system and based on the information identifying the second UPNP system, the second UPNP system to provide access to a wireless network provided by the first UPNP system;

configuring, by the first UPNP system, the second UPNP system to filter network traffic based on one or more network addresses or rules;

identifying, by the first UPNP system and from a plurality of parameters, one or more parameters to be monitored with regard to the second UPNP system, the one or more parameters identifying at least one of:

a physical layer data rate, data indicating channel occupancy, an operating channel associated with the second UPNP system, one or more received signal strength indicator (RSSI) values, data identifying available air time associated with the second UPNP system, an error rate, or a noise value associated with the second UPNP system;

providing, by the first UPNP system and to the second UPNP system using a UPNP protocol, information identifying the one or more parameters to be monitored, the information identifying the one or more parameters to be monitored including data that causes the second UPNP system to monitor the one or more parameters;

receiving, by the first UPNP system and from the second UPNP system and using the UPNP protocol, a value associated with at least one of the one or more parameters;

identifying, by the first UPNP system, an action to be performed based on the value associated with the at least one of the one or more parameters; and performing, by the first UPNP system, the action, or causing the second UPNP system to perform the action, using the UPNP protocol.

12. The method of claim 11, further comprising:
authenticating the second UPNP system based on the information identifying the second UPNP system.

13. The method of claim 11, where configuring the second UPNP system to provide access to the wireless network provided by the first UPNP system comprises:
configuring the second UPNP system to provide access to or extend a range of a plurality of wireless networks that are provided by the first UPNP system,
the plurality of wireless networks including the wireless network.

14. The method of claim 11, further comprising:
determining that network information associated with the wireless network has changed; and
providing updated network information to the second UPNP system based on determining that the network information has changed.

15. The method of claim 11,
where receiving the value associated with the at least one of the one or more parameters comprises:
receiving the value associated with the at least one of the one or more parameters based on providing the information identifying the one or more parameters to be monitored,
the second UPNP system selectively providing the value associated with the at least one of the one or more parameters, and not providing another value associated with at least one of other parameters of the plurality of parameters, based on the information identifying the one or more parameters to be monitored.

16. The first UPNP system of claim 1, where the one or more parameters further identify at least one of:
a transmit opportunity value that identifies available air time associated with the second UPNP system,
an average RSSI value of the second UPNP system,
a packet error rate associated with the second UPNP system,
or
a noise floor of the second UPNP system.

17. The first UPNP system of claim 1, where the one or more parameters identify:
the data indicating channel occupancy,
the operating channel associated with the second UPNP system, and
the one or more RSSI values.

18. The first UPNP system of claim 1, wherein:
the one or more parameters further identify a transmit opportunity value that identifies available air time associated with the second UPNP system, and
the at least one of the one or more parameters comprising: the transmit opportunity value.

19. The first UPNP system of claim 1, wherein the one or more processors, when identifying the action to be performed, are to:
provide, to a server device, the value associated with the at least one of the one or more parameters; and
receive, from the server device, data identifying the action to be performed.

20. The method of claim 11, wherein the one or more parameters identify:
the data indicating channel occupancy,
the operating channel associated with the second UPNP system,
the one or more RSSI values, and
the data identifying the available air time associated with the second UPNP system.

* * * * *